April 9, 1963    M. M. WALLACE ETAL    3,084,719
METHOD OF SEALING SEWER LINES AGAINST LEAKAGE
Filed March 15, 1960
FIG_1
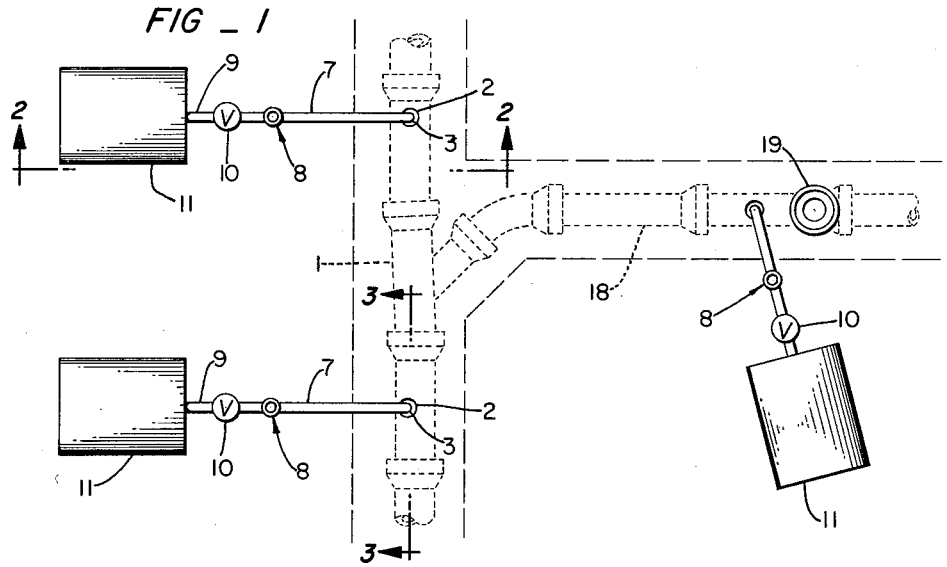
FIG_2
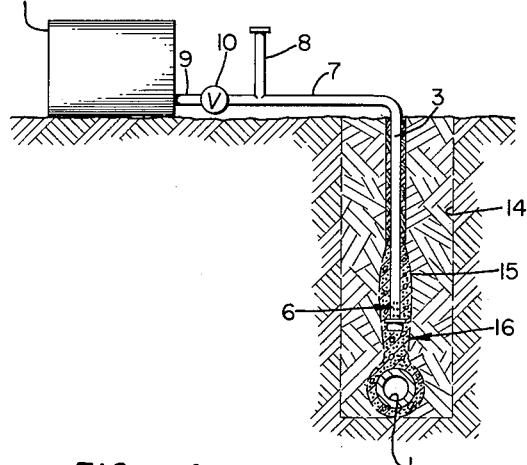
FIG_3
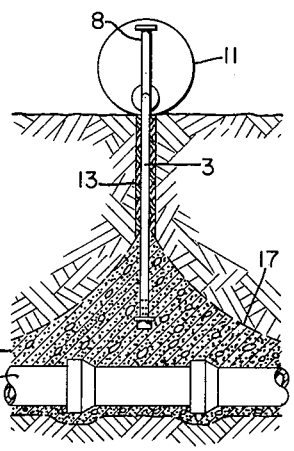
FIG_4
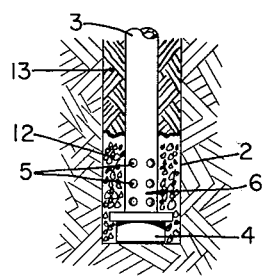
INVENTORS
MARSHALL M. WALLACE
EUGENE B. DYKES
BY
Boyken, Mohler + Wood
ATTORNEYS

United States Patent Office 3,084,719
Patented Apr. 9, 1963

3,084,719
METHOD OF SEALING SEWER LINES
AGAINST LEAKAGE
Marshall M. Wallace and Eugene B. Dykes, Santa Rosa, Calif., assignors to the County of Sonoma of the State of California, Santa Rosa, Calif.
Filed Mar. 15, 1960, Ser. No. 15,179
2 Claims. (Cl. 138—97)

This invention relates to a method of sealing sewer lines against leakage and has for one of its objects the provision of a method for effectively and economically stopping the leakage of ground water into sewer lines and for effectively stopping the leakage of sewage out of such lines, with such sealing to be done from outside the sewer lines and appurtenances.

The problem of sealing sewer lines against leakage exists in all municipalities, since the spigot-bell joints in the pipes are particularly susceptible to leakage. Also the pipes are susceptible to cracking under strains that may be imposed thereon from different sources.

One of the methods heretofore adopted for sealing sewer lines against leakage has been that of applying various sealants to the inside of the sewer pipe.

At best this method is costly at locations where it can be used. All excess sewage flowing into the section of the line being treated with the sealant must be pumped past the section to the next downstream manhole, which poses a real problem where manhole spacing is excessive and where sewage flows are high.

In hilly terrain or where distances between manholes are large, the internal sealing method is prohibitive in cost since it would require exposing the pipe at close intervals and plugging it at such intervals during the sealing operation to prevent the building adjacent to the lines being treated from being flooded.

The above are only a few of the objections to the method of sealing sewer lines internally.

Any method of externally sealing the sewer lines that would require exposing the pipe, or excavating the earth where the pipe is at a known depth, is prohibitive in instances where the leakage is such as can be substantially stopped without replacement of the pipe itself. In most instances, such replacement is not essential, inasmuch as such leakage usually occurs at the joints where the pipe itself is good. Furthermore where the sewer lines are below streets, and in which instances the pipes are at a known depth, the exposing of the pipe would require making excavations that would be obstacles to the rapid flow of traffic, as well as creating dangerous hazards for motorists and pedestrians, to say nothing of the road damage and expense of re-paving portions thereof.

Attempts to externally seal sewer pipes against leakage by driving pipes into the ground and attempting to drive cement through such pipes to jacket the joint or opening have not been generally adopted due to the virtual impossibility in some instances of forcing the cement into the hard packed soil and also due to lack of any control over where the discharge material will flow.

It is pertinent to note that while the depth of the pipe below the surface of the ground is known where the sewer lines are under the street, and while the course of the lines is readily determined, the exact location of the joints or points of leakage is not determinable. The sewage usually tends to flow along and below the pipe, creating channels, and in many instances substantial voids or pools may be formed that may be around or adjoining the pipe at the point of leakage or at points a substantial distance therefrom. While evidence of leakage is not usually evident at the surface of the ground, such evidence, if it existed, would not necessarily be determinative of the location of the point of leakage.

In view of the above, it is manifest that a method of applying the sealant externally must be economical since most of the lines shoulde be treated at sufficiently close intervals along the lines to insure sealing the joints.

By the present method, the soil around the line is loosened and processed to facilitate the flow of the sealant around and along the pipe including the joints and any openings in the pipe so that the flow of the sealant will be controlled to the end that it will pass to the area where it will effectively seal the sewer line against leakage. This is accomplished by the present method substantially without road damage through excavating to expose the sewer pipe, and without interfering with traffic for more than substantially the time to drill the desired number of small diameter holes to points spaced above the pipe and to insert sealant feed pipes into the holes so drilled. There is no plugging of the sewer line being treated nor possibility of house flooding, nor by-passing of sewage during the sealing operation.

Furthermore, by the present method, observation of the effectiveness of the sealing operation is made possible so the operator can quickly determine if the sealant is reaching the points where leakage is occurring.

Other objects and advantages will be obvious from the description and drawings.

In the drawings,

FIG. 1 is a semischematic plan view illustrating a typical application of one of the steps of the method of sealing sewer lines, such as a main sewer line and a house service line.

FIG. 2 is a sectional view along line 2—2 of FIG. 1.

FIG. 3 is a sectional view along line 3—3 of FIG. 1, with the sewer pipe in elevation.

FIG. 4 is an enlarged fragmentary sectional view at the discharge end of the sealant delivery pipe showing the end of the pipe in elevation.

In detail, one of the first steps to be taken is to locate the sewer line to be treated, which is accomplished in the usual manner by inserting a steel sewer cleaning rod into the line. An electronic metal detector above the surface of the ground will indicate the path of the cleaning rod, which, of course, is the path of the sewer line.

After the main sewer line 1 and its course are determined, substantially equally spaced vertical holes 2 (FIGS. 1, 4) are drilled over said line from the surface of the ground or pavement, to a predetermined spaced safe distance above the sewer pipe. The space between the sewer pipe and the bottom of the hole that is drilled should be such that there is no likelihood of the pipe being damaged by the drill.

It has been found that approximately 0.8 of a foot is a safe distance, although this method is not necessarily restricted to this distance.

Insofar as the spacing between holes is concerned, this is largely determined by the type of soil encountered, since the spacing between holes may be greater in sandy or loose soil than where it is clay or hard packed.

After each hole 2 is drilled, an applicator pipe 3 is lowered into the hole, which pipe may be a plain steel pipe having a closure cap 4 thereon closing the lower end (FIG. 4) and formed with a plurality of spaced openings 5 in its sides adjacent to the cap. The hole 2 is slightly larger in diameter than the outside diameter of the pipe 3 therefore the pipe may be readily lowered into the hole 2 until the cap 4 rests on the bottom of the latter. The openings are preferably restricted to the last four or five inches of the pipe along its length adjoining the cap, but this exact distance is not to be considered restrictive, since it may vary. This lower portion of pipe 2 may be generally designated 6 and will be called the "applicator."

The upper end of the applicator pipe 3 will normally extend slightly above the surface of the ground, or pavement, and is connected by an elbow with a horizontally extending length of pipe 7 of sufficient length to extend to one side of the street or highway where the leg of a T fitting connects with a riser pipe 8 that, in turn, is fitted at its upper end with a suitable pressure fitting for connection with any suitable means for applying pressure to oil to be introduced into the pipes 3, 7.

A horizontal pipe 9 having a manually actuable valve 10 thereon connects the T fitting on pipe 7 with the lower end of a supply tank 11.

Pipe 7, being on the pavement or ground, may be held down by suitable staples to enable vehicles to pass thereover without dislodging it, or it may be bridged if desired. In any event, the presence of the pipe 7 does not obstruct the normal flow of traffic when it is on the street.

The lower end of hole 2, from the bottom thereof to at least the upper level of the applicator 6, may be filled with material 12 such as pea gravel or any material suitable for preventing closure of the openings 5 against flow of oil or liquid therethrough. Usually a handful or two of this material is adequate.

Earth or other materials of small increments 13 (FIG. 4) may then be tamped into the hole around the pipe 3 to close off the latter above the level of the applicator.

The container 11 and pipes 9, 7, 3 are then filled with a primary sealant such as a low viscosity road oil. A cutback oil commonly known as SC-1 is suitable, and this oil will extend up into the riser pipe 8 to the same level as the oil level in tank 11. The oil well known in the industry as SC-1 is a liquid petroleum product, produced by fluxing an asphaltic lease with suitable distillates. A condensed specification of this product is as follows:

| Characteristic | A.S.T.M. Test Method | Requirement |
|---|---|---|
| Flash Point, °F | D92 | 150+ |
| Furol Viscosity @ 122° F. Sec | D88 | 75-150 |
| Water, percent | D95 | 0.5- |
| Distillation: | | |
| Total Distillate to 680° F | D402 | 10-30 |
| Float Test on Residue @ 122° F. sec | D139 | 20-100 |
| Asphalt Residue of 100 Penetration, percent. | D243 | 50+ |
| Ductility Asphalt Residue @ 77° F | D113 | 100+ |
| Solubility in CCl₄, percent | D4 [1] | 99.5+ |

[1] Except that CCl₄ is used instead of carbon disulphide as solvent, Method No. 1. If the material fails to meet the requirement for solubility it will be acceptable if its solubility in carbon disulfide is 99%+ and proportion of bitumen soluble in CCl₄ is 99.65%+.

A fluid pressure line (not shown) is then connected with the upper end of the riser pipe. The valve 10 is closed and fluid pressure is applied to the oil in applicator pipe 3 from any suitable source, such as a pump, to a degree sufficient to "crack" the soil above the pipe line to enable the sealant to penetrate the soil from the applicator 6 to the sewer pipe 1. A pressure of from approximately 40 to 80 lbs. per square inch is usually adequate to accomplish this "cracking" or breaking of the soil, sufficient to enable penetration and distribution of the oil to the sewer pipe, and as soon as this happens, the occurrence is apparent from a sharp drop in the applicator pressure. As soon as this pressure drop occurs, indicating that the soil to the sewer pipe has been broken, the pressure applied to the sealant is removed and valve 10 is opened, permitting the sealant in tank 11 to flow by gravity from said tank through the applicator 6 and into the soil.

No exact amount of pressure for accomplishing the desired "cracking" step can be established, nor can the exact amount of sealant to be used be determined in advance.

The type of soil encountered largely determines the pressure required for the cracking step. The amount of sealant required per foot of line sealed will be determined by the soil type; condition of sewer lines and appurtenances being treated, etc. In some cases where the soil is largely impervious to water and the original trench excavation was held to a minimum and line leakage is not excessive, the quantity of primary sealant required may be approximately one gallon per foot of sewer line. In other instances where the soil conditions made abnormally large trench excavations necessary, the quantity of primary sealant may be several times one gallon per foot.

As seen in FIG. 2 the walls 14 may indicate the walls of the original trench in which the sewer pipe was laid. The line 15 around the applicator pipe and sewer pipe indicates, generally, the outline of an area 16 that is penetrated by the sealant, and this area is within the "fill" that is within the original trench. This fill being originally loose material, is the material that is "cracked." FIG. 3 indicates the same area 16 extending longitudinally of the pipe 1, the upper line 17 of which indicates the hydraulic gradient of the sealant during application.

The soil around the pipe itself, including the underside, is, of course, directly in contact with the leaking sewage, hence is loosened, and normally channels will form in the soil along the pipe, from the points of leakage into which the sealant will readily flow. Also the soil type is normally logged, which is to some extent determinative of the degree of penetration that will be accomplished by the oil.

This primary sealant itself does not seal the pipe line, but it prepares a pathway for a rapid set emulsified asphalt that will follow, and which is generally known under the designation of RS-1, which is an asphalt emulsion with water. This pathway prepared by the primary sealant is essential to prevent spontaneous breaking of the emulsified asphalt upon contact thereof with dust or dirt particles, rock, surface of sewer pipe, etc., which would prevent the necessary penetration and distribution thereof before effective penetration and distribution has been effected.

RS-1 emulsified asphalt used in the present method, conforms to American Society of Testing Materials (A.S.T.M.) designation D977–57 and has a Saybolt Furol viscosity, 60 ml. at 77° F. (25° C.) of 20–100 sec.

After the desired amount of the primary sealant has penetrated the soil around the sewer pipe for the desired distance along the latter, a secondary sealant comprising said RS-1, or emulsified asphalt, is placed in tank 11, which secondary sealant may have approximately a low viscosity similar to water, or to the primary sealant.

The valve 10 is then opened and the secondary sealant is permitted to flow by gravity through the applicator and into the previously treated soil. Proper sealant distribution cannot be obtained through auxiliary pressure applicator to the sealant, such as has been attempted with cementitious material alone.

It is obvious that the success of the applicator of the secondary sealant is dependent in the coverage obtained by the primary sealant, and which coverage has been mentioned hereinbefore. Usually the quantity of the secondary sealant used is approximately the same as the quantity of the primary sealant that was used.

During the application of the secondary sealant, the sewer line is preferably flushed to the extent required to remove the sealant from the lines, which may be accomplished by use of a conventional sand trap at the downstream side. Normally observation of the flushing water at the downstream side will also indicate by discoloration thereof, and the presence of the primary sealant, and later the secondary sealant, that the sealants have reached the leak or leaks.

Various techniques may be used to stop large breaks or openings in the sewer pipe, such as the application of salt or other de-emulsifiers to the emulsified asphalt at the opening or break in the pipe, which application may be made interiorly of the pipe by salt water, or whatever de-emulsifier is used. This effects a very rapid hardening of the asphalt emulsion upon its contact with the salt water.

The same method may be practiced for sealing a house service sewer pipe 18 (FIG. 1). Usually in this instance the hole for the applicator is formed next to the property line clean out 19 of the house service sewer. In the event the depth of the pipe below the surface of the ground is not known, the hole for the applicator may be hand dug instead of being drilled, so as to eliminate the likelihood of accidental damage to the pipe. In such house service lines the pipe will be of substantially less depth than the main sewer line with which they connect, and also there is normally no pavement to dig up or to disturb.

The area 16 (FIGS. 2, 3) indicates the solidified sealant, which encloses the joint and pipe 1 a substantial distance along the sewer line. The spacing between holes 2 will determine whether the areas 16 from adjacent holes will join to form a complete covering for the sewer line of any desired length, according to the spacing of the applicator.

While the primary sealant, which is a liquid that is miscible with the asphalt emulsions, has been described as penetrating the soil, and as forming passageways to and around the pipe, it could be said to coat the pipe, rock and soil particles so that the asphalt emulsion will not contact any dust, or uncoated rock or sewer surfaces that would cause breaking of the asphalt emulsion. The loosening of the soil by the application of pressure to the primary sealant merely enables the primary sealant to pass through the soil to form sealant lined passageways for the secondary sealant.

After the desired amount of asphalt emulsion has been applied through the applicator, the latter may be quickly removed by blowing the material 13 out of each hole 2 by air ejected into the hole through a small pipe. In this connection it should be noted that the pipe 3, after being positioned in the hole 2 and after material 13 is tamped around it, cannot be removed until said material 13 is removed. Any attempt to pull it out of the ground by sheer force will, until the tamped material is removed, break the pipe, but the use of compressed air directed against the material 13 quickly removes it so the pipe may be quickly removed.

We claim:
1. The method of sealing leaks in underground sewer pipe along which leakage therefrom has formed channels and loosened soil, that comprises the steps of:
   (a) discharging a road oil having approximately the viscosity of water into the body of soil at a point adjacent to but spaced above a portion of said pipe along which said channels and loosened soil are located at a pressure sufficient to crack the soil between said channels and loosened soil, and said point to provide a passageway for said oil from said point to said portion of said pipe and to said channels and said loosened soil; then
   (b) discontinuing said pressure on said oil; then
   (c) supplying a sufficient amount of oil to said passageway for flowing therethrough and through said channels and said loosened soil to coat the walls of said channel and the particles of said loosened soil with said oil, and then,
   (d) discontinuing the supply of said oil to said passageway, and
   (e) discharging a sufficient quantity of asphalt emulsion of approximately the viscosity of said oil through said passageway and into said channels and loosened soil to fill the interstices between the discrete particles of said soil and to flow through and fill said channels and to surround said portion of said pipe whereby said asphalt emulsion will seal said portion of said pipe against leakage, and then
   (f) ceasing the discharge of said asphalt emulsion into said passageway and permitting said asphalt emulsion around and against said pipe to solidify.

2. The method of sealing leaks in underground sewer pipe along which the leakage therefrom has formed channels and loosened soil, that comprises the steps of:
   (a) forming a hole in the ground from the surface thereof to a point spaced from a portion of said pipe along which said channels and loosened soil are located leaving soil between said portion and said hole;
   (b) discharging an oil having substantially the characteristics of "SC–1" into said hole under pressure sufficient to crack the soil between said hole and said portion to provide a passageway for oil from said hole to said channels and loosened soil; then substantially immediately thereafter
   (c) discontinuing the pressure on said oil and coating the walls of the interstices between particles of said soil and the walls of said channel with said oil by supplying oil to said hole and permitting the oil so supplied to flow by gravity from said hole through said channels and said loosened soil; then
   (d) discontinuing the supply of oil for flowing by gravity through said channels and said loosened soil; and thereafter
   (e) discharging a quick set water asphalt emulsion having substantially the characteristics of "RS–1" through said passageway from said hole and into said loosened soil and channels to fill them and to surround said pipe in engagement with the latter.

References Cited in the file of this patent
UNITED STATES PATENTS

| | | |
|---|---|---|
| 1,507,868 | Stubbs | Sept. 9, 1924 |
| 2,003,921 | Chevrillon | June 4, 1935 |
| 2,201,459 | Hulst | May 21, 1940 |
| 2,713,906 | Allen | July 26, 1955 |
| 2,917,085 | Douse | Dec. 15, 1959 |